United States Patent [19]
Hartmann

[11] 3,943,603
[45] Mar. 16, 1976

[54] APPARATUS FOR ALIGNING THE TAIL PARTS OF FISH

[75] Inventor: Franz Hartmann, Bad Oldesloe, Germany

[73] Assignee: Nordischer Maschinenbau Rud. Baader, Lubeck, Germany

[22] Filed: Apr. 17, 1974

[21] Appl. No.: 461,609

[30] Foreign Application Priority Data
Apr. 19, 1973 Germany.............................. 2319923

[52] U.S. Cl. .................................................. 17/53
[51] Int. Cl.² ........................................... A22B 5/08
[58] Field of Search ................ 17/56, 53, 57, 59, 54

[56] References Cited
FOREIGN PATENTS OR APPLICATIONS
310,244   1968   Sweden.................................. 17/54

*Primary Examiner*—Robert Peshock
*Attorney, Agent, or Firm*—Edward F. Levy

[57] ABSTRACT

Apparatus for aligning and conveying fish includes four vaned wheels mounted in pairs, two upper and two lower. The upper and lower vanes move between one another in the manner of paddle wheels and the upper pair can be moved towards and away from the lower pair for varying cross section of the fish.

8 Claims, 4 Drawing Figures

APPARATUS FOR ALIGNING THE TAIL PARTS OF FISH

BACKGROUND OF THE INVENTION

This invention relates to the conveying of fish. German Offenlegungsschrift No. 1936653 discloses a device for processing fishes to form fillets and in which a fish, placed on its back on a flat V-shaped table and having its tail fin and dorsal fin centred in a longitudinal groove disposed in the said table, is pushed manually tail first beneath a cover of inverted V-shaped cross-section and subsequently between two double cone wheels which convey the fish under a fork and then against two knife systems. Each of the double cone wheels comprises two pairs of truncated cones which counter-rotate about vertical shafts, the upper pairs tapering downwardly and outwardly and enclosing an acute angle between them, the lower pairs being constructed as discs the edge of which include an angle of approximately 90° between them in the upward and outward direction. This device suffers from the disadvantages that gaps remain between all the cone wheels so that continuous guiding action is not obtained and that the surface enclosed when the cone wheels are completely advanced towards each other is far too large to be able to centre, guide and align the tail root region or the tail fin of a fish.

SUMMARY OF THE INVENTION

The object of the invention is so to improve the known device as to permit reliable alignment of the tail fins, tail roots and tail parts of fishes fed tail first into a fish processing machine.

According to one aspect of the invention apparatus for aligning fish comprises first and second wheel assemblies each affording vanes which, during rotation, are arranged to move in between one another, the vanes of the assemblies being relatively movable towards and away from one another to vary the cross-section of a fish conveying space disposed between them.

The particular advantages achieved by the invention are that the conveying cross-section can be kept so small that the tail fin and tail root of the smallest fish is centered and conveyed and during its passage the tail part of the fish is surrounded in an enclosed cross-section by the vanes of the wheel assemblies.

According to another aspect of the invention apparatus for aligning and conveying fish comprises upper and lower pairs of drive wheel assemblies, each assembly affording rotary vanes and the vanes of the upper assemblies being arranged to extend between the vanes of the lower assemblies and vice-versa during rotation thereof, the upper and lower drive wheel assemblies being relatively displaceable to define a varying size of fish conveying space between them.

According to a specific embodiment of the invention a feed-in conveyor is included which has a fish-transport speed substantially lower than the speed of transport by the drive wheel assemblies. Stretching and alignment of the tail part of a fish by its tail fin and tail root is therefore reliably ensured even if it previously assumed a bent or undulating shape. The feed-in conveyor may comprise a pair of movable belts defining a trough the speed of which is approximately half the fish-transport speed of the drive wheel assemblies. This ensures that the tail parts of the fishes are stretched with the required velocity difference.

One pair of drive wheel assemblies may have fish-engaging surfaces which rotate through a cylindrical path, whilst the other pair may have fish-engaging surfaces which rotate through a frusto-conical path. This makes it possible to obtain a construction which is suitable for small and medium sized fishes of the Gadidae family.

DESCRIPTION OF THE DRAWINGS

The invention may be carried into practice in various ways but one specific embodiment will now be described with reference to the accompanying diagrammatic drawings in which.

Figure 1:
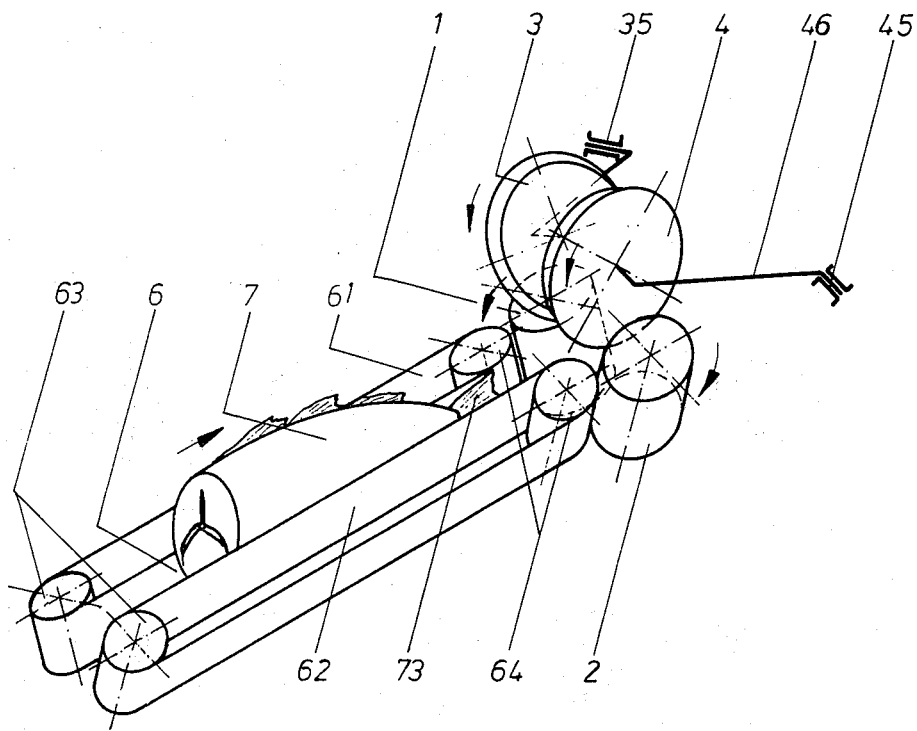
FIG. 1 is a schematic perspective view from above of a device according to the invention.

A conveyor in the form of a pair of belts 61 and 62 running between drive rollers 64 (which are inclined to one another at 60°), provides a longitudinal trough 6 for fish 7. The fish is conveyed dorsal side upwards and tail first, from left to right in FIG. 1. Situated adjacent the rollers 64 are four drive assemblies arranged in pairs, namely a lower pair 1, 2 and an upper pair 3, 4.

In FIG. 1 the drive assemblies are only shown diagrammatically; in fact, each comprises what may be termed a vaned wheel or rotor.

Figures 2, 3:
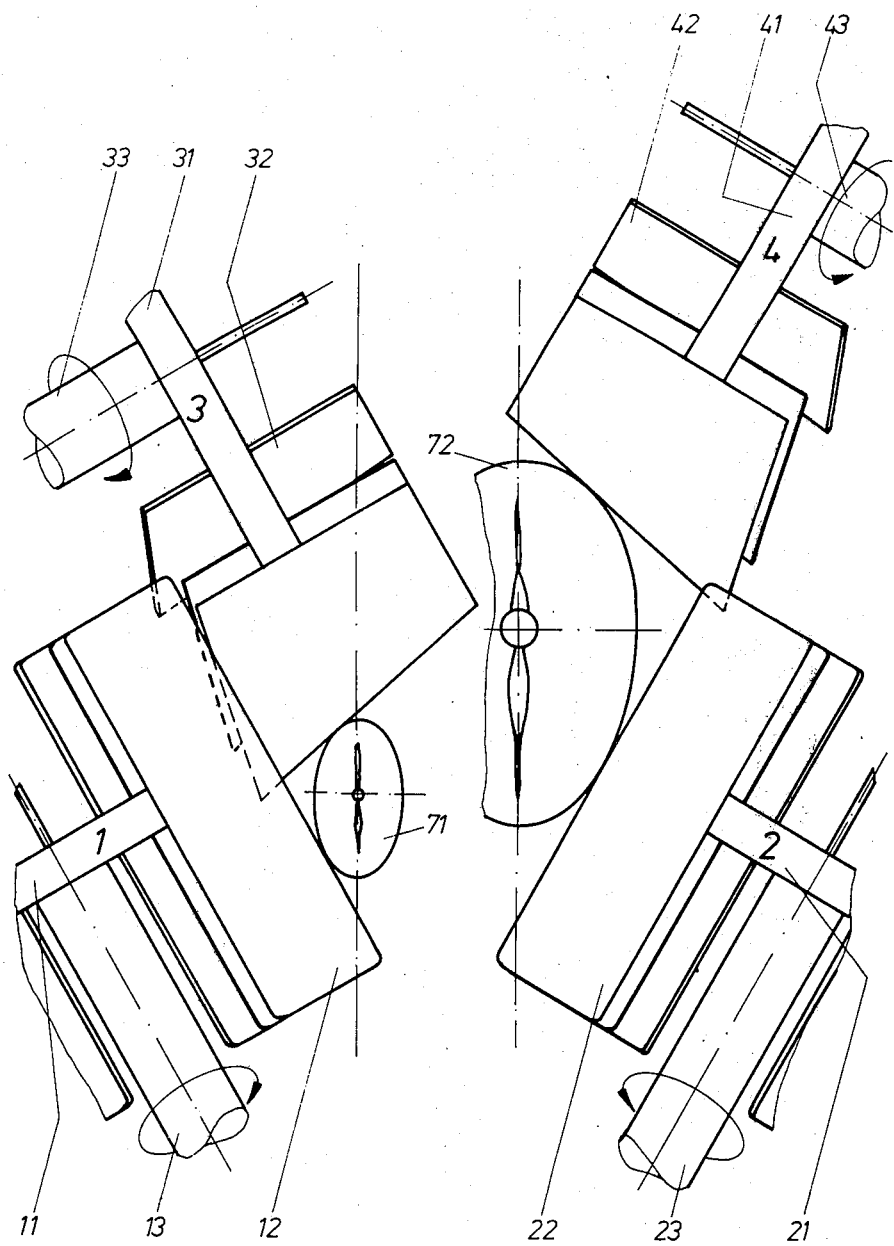
FIG. 2 is a left-hand partial section showing the device assemblies engaging a fish adjacent its tail end.
FIG. 3 is a right-hand partial section showing the drive assemblies engaging the tail part of a fish close behind the end of the belly cavity, the vanes of the drive assemblies nearest the viewing side having been omitted from FIGS. 2 and 3 in the interests of clarity.
Figure 4:
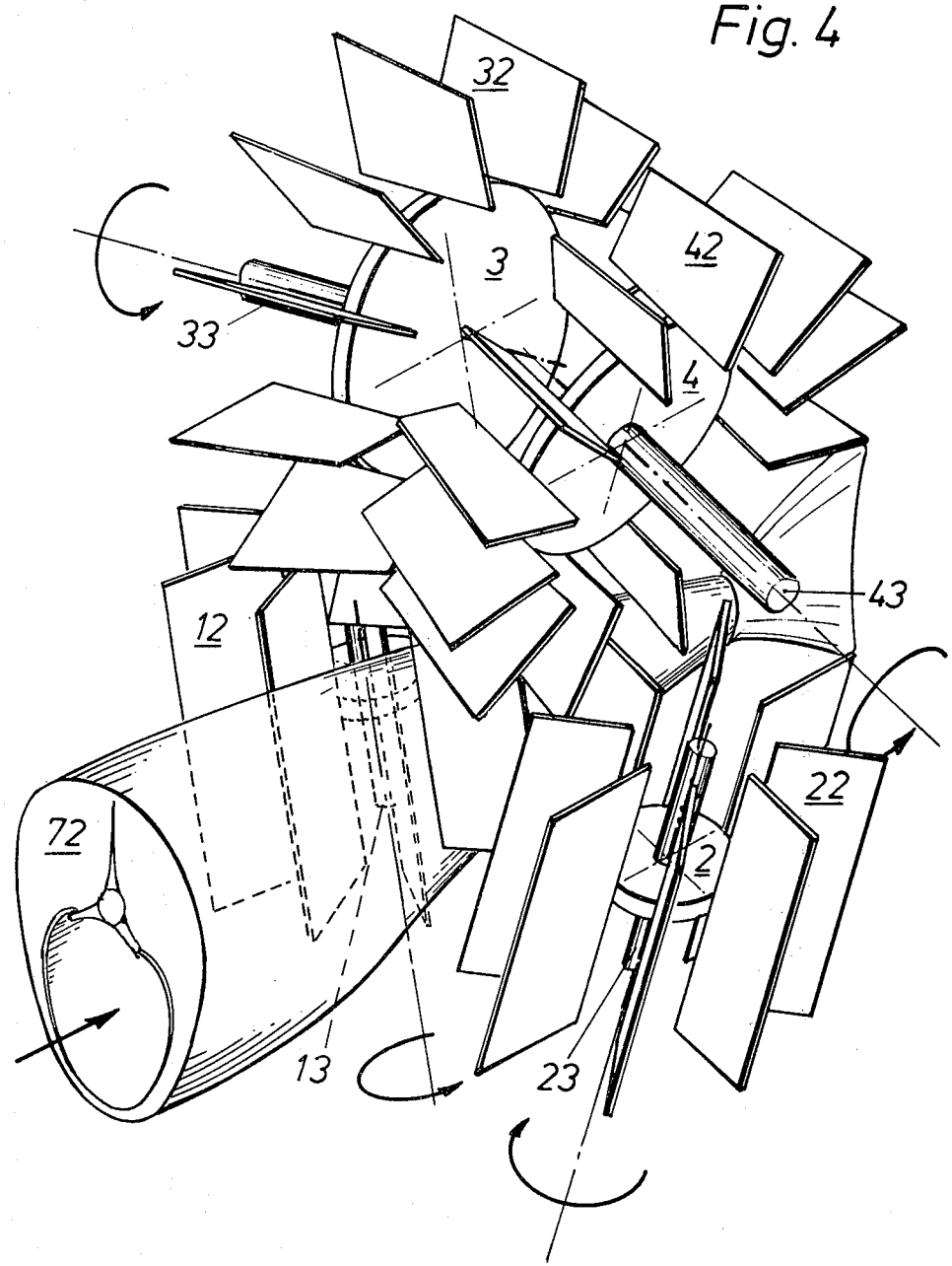
FIG. 4 is a perspective view of the rotors and vaned impellers of the apparatus of the invention, showing the manner in which the impellers engage opposing surfaces of a fish fed therebetween.

The lower assemblies 1, 2 include shafts 13, 23 respectively which are each mounted at approximately 60° with respect to the vertical, in a casing (not shown) and are arranged to be continuously driven in any suitable manner in the direction of the counter-rotating arrows shown in FIGS. 3 and 4.

The upper end of the shafts 13, 23 have identical vaned wheels mounted thereon, the thin vanes or impellers 12, 22 respectively of which are mounted equidistantly, the cylinders defined by the rotation of these vanes being shown for simplicity in FIG. 1.

The upper drive assemblies comprise two identical vaned wheels 32, 42 which are similar to those of the lower assemblies, and which are mounted on shafts 33, 43 respectively which in turn are mounted on arms 46. These arms are pivotally mounted by bearings 35, 45, respectively, in the casing (not shown). The bearings have their axes mounted at right angles to the respective shaft 13, 23. Each arm 46 is constructed as a hollow member to accommodate a toothed driving belt or the like in order that the wheels of the upper drive assemblies may be driven in synchronism with the wheels of the lower assemblies, the vanes or impellers of the upper and lower assemblies being so shaped and arranged to pass between one another without engagement.

The drive speed of the drive assemblies is arranged to be twice that of the conveyor belts 61, 62. In operation the fish is placed belly downwards as shown in FIG. 1 in the trough formed by these belts. It is fed tail first and as the tail fin runs off the belts, it moves into the rotational zone of the vanes of the vaned wheels and is stretched and centralised thereby exactly in the plane of symmetry of the device. In this way the fish is conveyed from the trough 6 so that it is able to run accurately into the fin guide of a following fish processing machine.

The upper wheels are able to rise and fall, downward movement being either by virtue of their own weight or with the aid of springs or weights. In this way, as a comparison of FIGS. 2 and 3 shows, the vanes of the upper and lower wheels define a variable gap between them. The form of this may vary; it may be square, rhombic or kitelike in form. Thus, in FIG. 2 the relatively small cross-section 71, in the region of the tail allows the upper vaned wheels to be lower than in FIG. 3 which shows the position of the cross section 72 of the fish adjacent the rear end of the belly cavity. In this way the region 71 of the fish moves into the zone of action of the vaned wheels whilst the tail fin is still being aligned, and thereafter the region 72 is engaged whilst the region 71 is still engaged and so on. The fish is thus conveyed in an accurate and accelerating manner as it is moved from the trough 6, the upwardly and outwardly arranged pivoting arms 46 enabling the size of the spaces between the vaned wheels to be adjusted to the cross-section of the fish at any one time.

The vaned wheels can be constructed in different ways. For example, the vanes can be formed of sheet metal, plastics or light alloy castings. The number of vanes and the distance between them can, of course, vary, the distance between them generally becoming progressively smaller as the overall size of the wheel increases.

What we claim is:

1. Apparatus for aligning fish comprising first and second wheel assemblies each comprising a pair of spaced rotors having radially-extending impellers, the impellers of the pair of rotors of the first wheel assembly being arranged to move in between the impellers of the respective pair of rotors of the second wheel assembly during rotation of said rotors, the impellers of the rotors in each pair being spaced from each other to define a space through which fish are conveyed when engaged by the rotating impellers, the impellers of at least one of said assemblies being relatively movable towards and away from the other assembly to vary the cross-section of said space to conform to the cross-section of the fish passing therethrough.

2. Apparatus for aligning and conveying fish comprising upper and lower drive wheel assemblies each assembly comprising a pair of rotors having radially-extending impellers, the impellers of each assembly being aranged to extend between the impellers of the other assembly during rotation thereof, the upper and lower drive wheel assemblies being relatively displaceable to define a varying size of fish conveying space between them.

3. Apparatus as claimed in claim 2, including a feed-in conveyor of which the fish-transport speed is substantially lower than the speed of transport by the drive wheel assemblies.

4. Apparatus as claimed in claim 3 wherein the feed-in conveyor comprises a pair of movable belts defining a trough the speed of which is approximately half the fish-transport speed of the drive wheel assemblies.

5. Apparatus as claimed in claim 2 wherein the impellers of the pair of rotors of one of the drive wheel assemblies have fish-engaging surfaces which rotate through a cylindrical path.

6. Apparatus as claimed in claim 5 wherein the impellers of the pair of rotors of the other drive wheel assembly have fish engaging surfaces which rotate through a frusto-conical path.

7. Apparatus as claimed in claim 6 in which the pair of rotors of one drive wheel assembly are mounted to rotate about axes which are substantially at right angles to the rotational axes of the respective pair of rotors of the other drive wheel assembly.

8. Apparatus as claimed in claim 7 wherein the pairs of rotors of one drive wheel assembly are fixedly mounted with their shafts at an acute angle to one another whilst the pair of rotors of the other drive wheel assembly are upwardly deflectable away from the opposite pair of rotors.

* * * * *